United States Patent [19]

Akita

[11] Patent Number: 4,837,804
[45] Date of Patent: Jun. 6, 1989

[54] TELEPHONE ANSWERING VOICEPRINT DISCRIMINATING AND SWITCHING APPARATUS

[75] Inventor: Koichiro Akita, Kamakura, Japan

[73] Assignee: Mitsubishi Denki Kabushiki Kaisha, Japan

[21] Appl. No.: 3,034

[22] Filed: Jan. 13, 1987

[30] Foreign Application Priority Data

Jan. 14, 1986 [JP] Japan .................................. 61-4243

[51] Int. Cl.⁴ ........................ H04M 3/38; H04M 3/50
[52] U.S. Cl. ........................................ 379/88; 379/84; 379/196; 379/211; 381/42
[58] Field of Search ...................... 381/42; 364/513.5; 379/80, 88, 89, 196, 197, 198, 199, 210, 211, 213, 214, 84

[56] References Cited

U.S. PATENT DOCUMENTS 4,481,384 11/1984 Matthews ............................ 379/188
4,580,012 4/1986 Matthews et al. ................... 379/89
4,653,097 3/1987 Watanabe et al. ................... 381/42

FOREIGN PATENT DOCUMENTS 2002160 9/1970 Fed. Rep. of Germany ...... 379/199
0130808 10/1979 Japan .................................. 379/199
0106260 6/1985 Japan .................................. 381/42
0150398 8/1985 Japan .................................. 379/89
0152167 8/1985 Japan .................................. 379/89
0163558 8/1985 Japan .................................. 379/196
0235566 11/1985 Japan .................................. 381/42

OTHER PUBLICATIONS

Translation of "Computer Voice Processing", Nakajima et al, Sampo Publication, pp. 166–168, Published Apr. 10, 1982.
Translation of "Voice Mail System Data Communication Handbook". Electronics Communication Society, OHM Company, pp. 436–437, Oct. 30, 1984.

Primary Examiner—Thomas W. Brown
Attorney, Agent, or Firm—Leydig, Voit & Mayer

[57] ABSTRACT

A voice mail system is furnished with voiceprint analysis and comparison units. In a first mode, the system discriminates whether the voiceprint of a calling party coincides with a predetermined voiceprint. If the voiceprint of the calling party does coincide with the predetermined voiceprint, the telephone circuit of the calling party is switched and connected to a predetermined telephone circuit. If the voiceprint of the calling party does not so coincide, a message from the calling party is accumulated as voice mail. Therefore, a telephone switching apparatus can be realized whose user can talk with a desired calling party without using a password and which functions as an answer phone when the telephone circuits are not switched. In a second mode, messages from the calling parties are accumulated as voice mail.

3 Claims, 4 Drawing Sheets

TELEPHONE ANSWERING VOICEPRINT DISCRIMINATING AND SWITCHING APPARATUS

BACKGROUND OF THE INVENTION

This invention relates to a telephone switching apparatus which discriminates the voiceprint of the calling party of a telephone and switches a telephone circuit when the discriminated voiceprint agrees with a specified voiceprint.

As an apparatus of this type, a voice mail system has heretofore been employed. It renders services such as the accumulation and exchange of messages among extension sets and the transmission and reception of messages to and from the calling parties of telephones, additional services for designating methods of handling the messages in association with the first-mentioned services, auxiliary services for efficiently utilizing the voice mail system, and so on.

FIG. 4 is a block diagram showing by way of example a conventional telephone switching apparatus which employs an electronic mail type system illustrated on page 436, in FIG. 2.14 of "Data Communication Handbook" edited by the Japan Society of Electronic Communication. Referring to the figure, a general telephone exchange network, such as a PBX, 1 is connected to a plurality of telephone sets $P_1$-$P_n$. A voice mail system 2 transmits and receives messages between it and the individual telephone sets $P_1$-$P_n$ through the telephone exchange network 1, and it is constructed as follows.

A plurality of circuit control units $Q_1$-$Q_n$, which are respectively connected to the telephone exchange network 1 and disposed in correspondence with the telephone sets $P_1$-$P_n$, serve as interfaces to the telephone exchange network 1. A voice processing unit 3 is connected to the circuit control units $Q_1$-$Q_n$ and a bus B, and it converts input analog voice information into digital signals. A voice response unit 4, which is connected to the circuit control units $Q_1$-$Q_n$ and the bus B and which outputs operational messages according to various processes through the synthesis of voice, to send set phrases to the calling party of the telephone in accordance with a predetermined program. It is made up of an LSI chip commercially available, for example, a channel vocoder or an LPC (linear prediction) vocoder. A central control unit 5 controls the whole voice mail system 2 through the bus B on the basis of a predetermined program. A disk device 6 is connected to the bus B, and it stores therein the predetermined programs, the messages as voice mail generated by the digital conversion in the voice processing unit 3, and so on. Other peripheral devices 7 are connected to the bus B.

The prior-art telephone switching apparatus is constructed as described above. In a mode where it is utilized as an answer phone during the user's absence, the user stores a message for making his/her absence known, in the disk device 6 beforehand. The voice response unit 4 answers to that effect to a calling party during the absence, and a message from the calling party is accumulated in the disk device 6 through the voice processing unit 3. Also, in a mode where the user has registered the telephone number of a place of his/her visit in the disk device 6 beforehand, the telephone circuit of the user's telephone number dialed by a calling party has the telephone number switched to transfer through any of the circuit control units $Q_1$-$Q_n$ and is connected to the telephone set at the user's destination, for example, the telephone set $P_j$ not shown.

In this regard, in a case where the user desires the transfer of calls from limited opposite parties only, he/she previously informs the parties of a password. Thus, only when the calling party has input the password through a dialing operation or with a voice signal during the user's absence is the call thereof switched and transferred to the telephone number of the user's destination.

Usually, during these processing operations, operation guidance through synthetic voice is sent to tee calling party through the voice response unit 4.

Since the prior-art telephone switching apparatus is constructed and operated as described above, it has the problem that, when the user has previously registered the telephone number of the destination to be switched to, the call to the user is unconditionally switched and connected to the telephone set of the destination even if the calling party is not one truly desired by the user, or the use of the password intended to prevent the former problem is troublesome and also unnatural.

SUMMARY OF THE INVENTION

This invention has been made in order to solve the problems as mentioned above, and has for its object to provide a telephone switching apparatus operable in a first mode in which, whether or not a call may be switched to the telephone circuit of the telephone at the destination of a user is automatically decided from the voiceprint of the calling party of the call.

In the telephone switching apparatus according to this invention, a voice mail system which controls a telephone circuit connectible with a plurality of telephone sets and which accumulates voice signals of calling parties received through the respective telephone sets and sends predetermined messages to the calling parties is additionally furnished with voiceprint discrimination means for discriminating whether or not a voiceprint of the calling party coincides with a predetermined voiceprint.

In this invention, while the voice mail system holds a conversation with the calling party, the voiceprint discrimination means analyzes the voiceprint of the calling party so as to decide whether or not the voiceprint of the calling party coincides with the voiceprint registered beforehand. When both voiceprints coincide, the telephone circuit of the calling party is switched and connected to a predetermined telephone circuit, and if they don't coincide, a message from the calling party is accumulated as voice mail. The telephone switching apparatus is also operable in a second mode in which no calling parties are switched and connected to the predetermined telephone circuit, and messages from all calling parties are accumulated as voice mail.

DESCRIPTION OF THE PREFERRED EMBODIMENT

Figure 1:
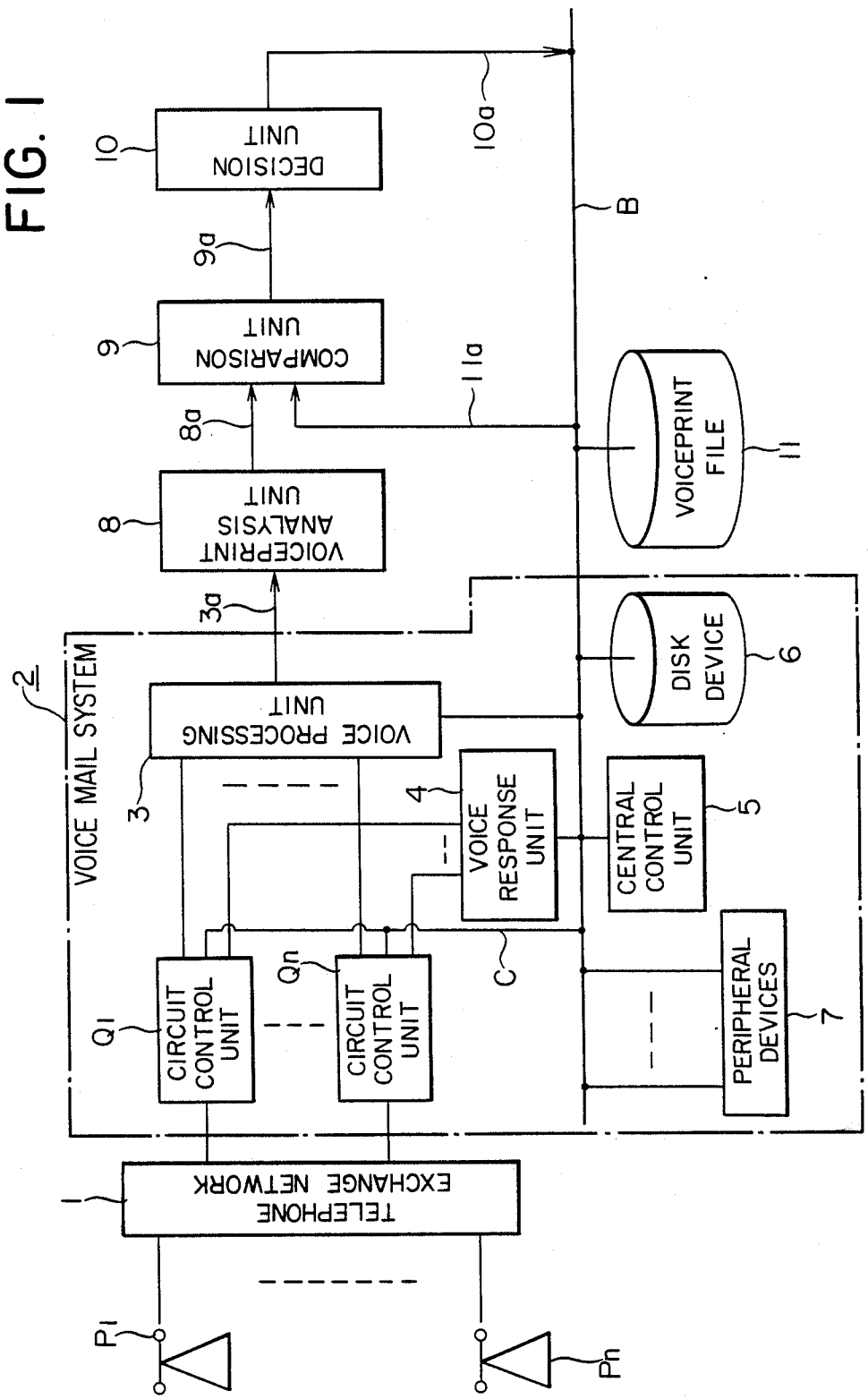
FIG. 1 is a block diagram showing an embodiment of this invention.

Now, an embodiment of this invention will be described with reference to the drawings. FIG. 1 is a block diagram showing an embodiment of this invention, in which portions 1-7, $P_1-P_n$ and $Q_1-Q_n$ are similar to those of the prior-art apparatus stated before.

A voice analysis unit 8 connected to the voice processing unit 3 is constructed of a well-known voice waveform analysis mechanism which subjects the formants, local peaks or any other voice energy of a voice signal 3a to a spectral analysis and extracts a voiceprint feature parameter signal 8a. A comparison unit 9 compares the voiceprint feature parameter signal 8a of a calling party applied from the voiceprint analysis unit 8, with a previously-registered voiceprint feature parameter signal 11a applied from a voiceprint file 11 to be described later, and it delivers a numerical data signal 9a which expresses the degree of similarity digitized as the difference of both the voiceprint feature parameter signals. By way of example, the comparison unit 9 is realized by a logic circuit or a program which evaluates the distance between two vectors. A decision unit 10 executes the threshold value processing of the numerical data signal 9a applied from the comparison unit 9, and it delivers a decision signal 10a to the central control unit 5 through a bus B. The decision signal 10a indicates whether or not the voiceprint of the calling party coincides with any of registered voiceprints. The voiceprint file 11 is connected to the bus B, and the voiceprint feature parameters of a desired number of specified persons are registered therein beforehand. This voiceprint file 11 may be built into the disk device 6 as a unit. The elements 8-11 mentioned above constitute the voiceprint discrimination means.

Figure 2:
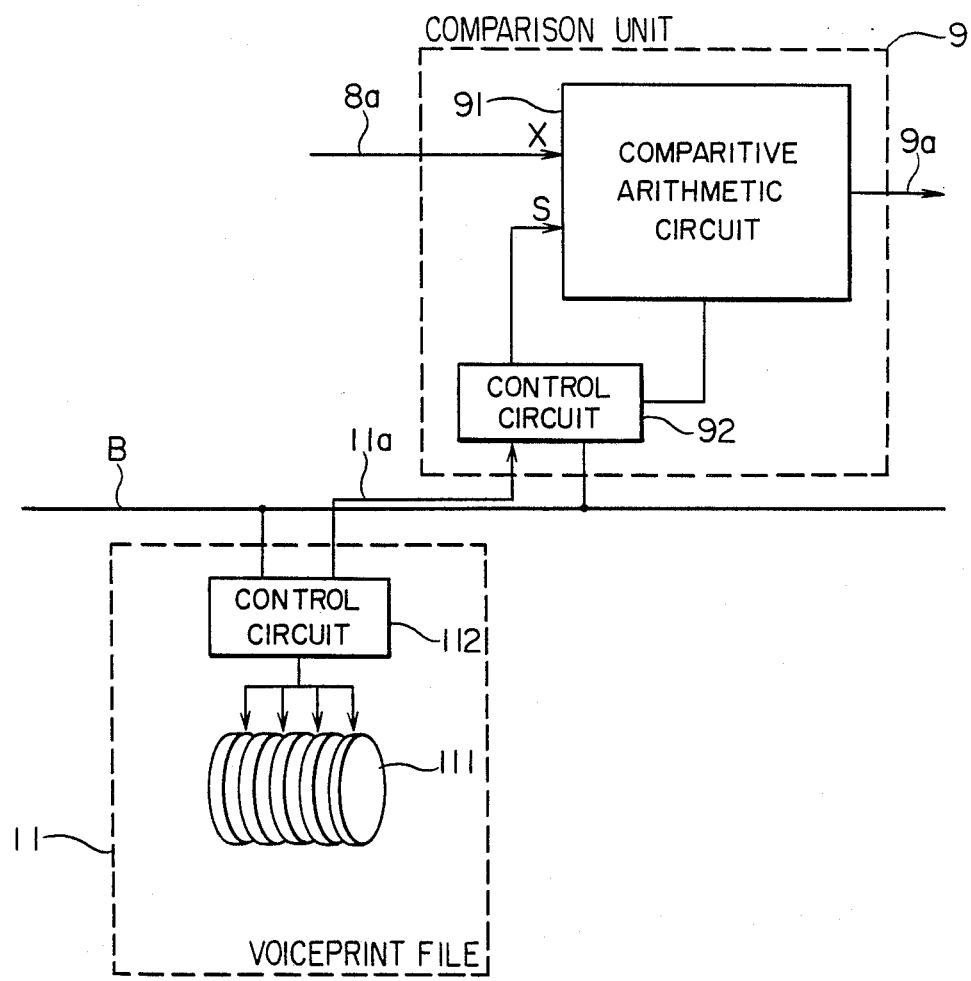
FIG. 2 is a block diagram showing a comparison unit and a voiceprint file in FIG. 1.

FIG. 2 is a block diagram which conceptually shows the arrangements of the comparison unit 9 and the voiceprint file 11 in FIG. 1. Referring to FIG. 2, a comparative arithmetic circuit 91 is constructed with software by way of example. It stores therein a well-known comparison program which serves to compare a feature vector X contained in the voiceprint feature parameter signal 8a of the calling party and a (reference) feature vector S contained in the voiceprint feature parameter signal 11a derived from the voiceprint file 11. The comparison program to be stored in the comparative arithmetic circuit 91 may be based on any of the following expedients (i)-(iii):

(i) Expedient which finds the value of $\cos\theta$ denoted by $$\cos\theta = X^t \cdot S / |X| \cdot |S|$$

(where $X^t$ indicates the transposed vector of X), and which decides the coincidence of both the feature vectors X and S when $\cos\theta$ is one (or at least predetermined value).

(ii) Expedient which finds the value of $|X-S|$ denoted by $$|X-S| = \Sigma |x_i - s_i|$$

(i=1 to N), and which decides the coincidence of both the feature vectors X and S when $|X-S|$ is zero (or at most a predetermined value). Here, $x_i$ and $s_i$ indicate components in respective dimensions as contained in the N-dimensional feature vectors X and S.

(iii) Any other expedient which employs a well-known dynamic programing.

A control circuit 92 is connected to the comparative arithmetic circuit 91, and it controls the delivery of the feature vector S from the voiceprint file 11 to the comparative arithmetic circuit 91.

A memory device 111 is disposed in the voiceprint file 11, and it stores the plurality of voiceprints registered beforehand. A control circuit 112 performs access to the memory device 111, and controls the delivery of the voiceprint feature parameter signal 11a to the comparison unit 9.

Figure 3:
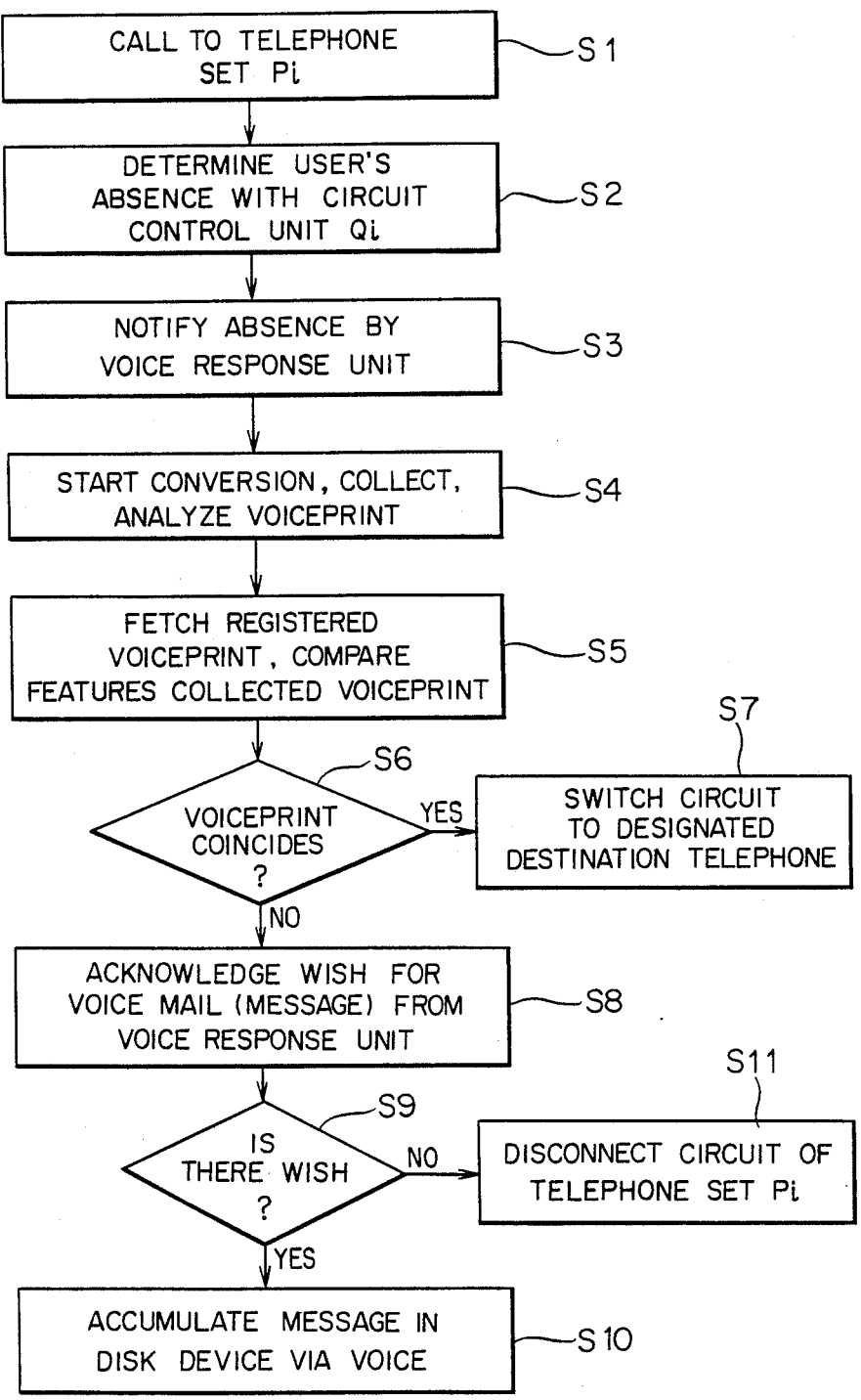
FIG. 3 is a flow chart for explaining the operation of this invention.
Figure 4:
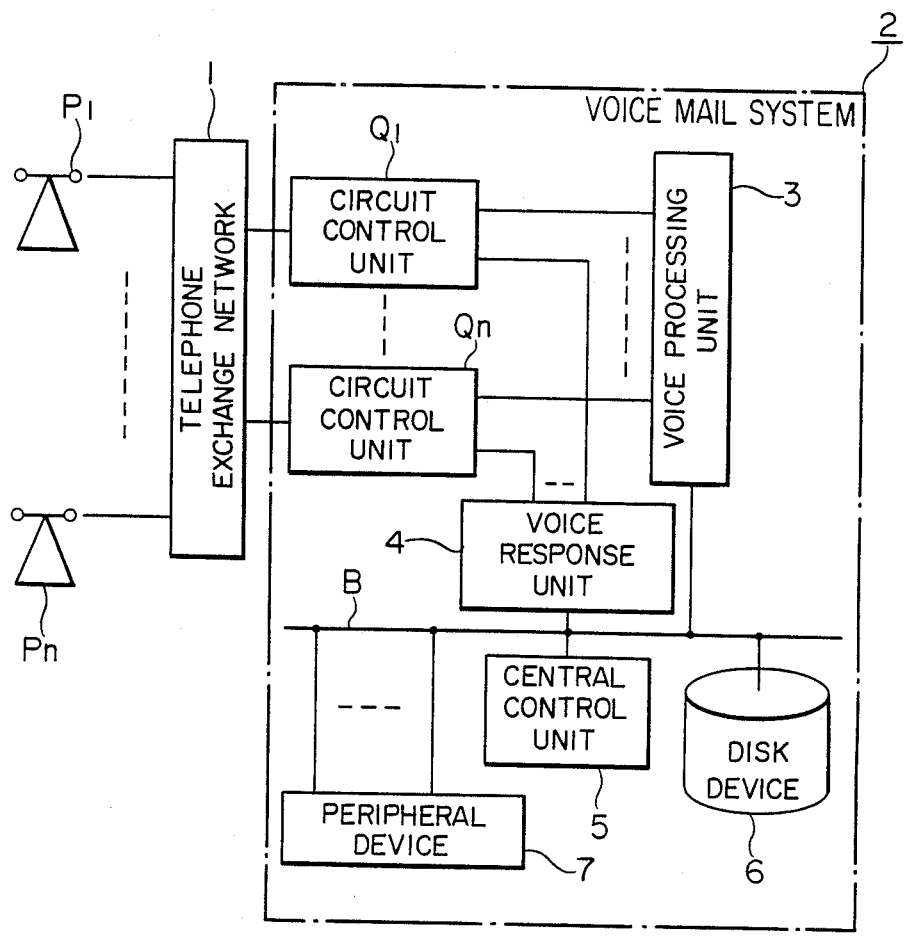
FIG. 4 is a block diagram showing a telephone switching apparatus of the prior art.

Referring now to the flow chart of FIG. 3, the operation of the embodiment of this invention shown in FIGS. 1 and 2 will be described. In the mode of utilizing the embodiment for an answering phone during the user's absence, the operation is quite the same as in the prior-art apparatus explained before. The mode of selectively switching and transferring a call to the telephone set $P_j$ of the destination where the user has gone will be explained herein. First, the user registers the voiceprints of parties whose calls are desired to be transferred, in the voiceprint file 11 and the telephone number of the telephone set $P_j$ of the destination in the disk device 6 beforehand.

When the user is called up during his/her absence, the voice response unit 4 informs the calling party of the user's absence through the circuit control unit $Q_i$ of the called telephone set $P_i$ (not shown) of the user's house by way of example (steps S1-S3). In the course of the conversation between the calling party and the voice response unit 4, the voiceprint analysis unit 8 analyzes the voice signal 3a applied through the voice processing unit 3 and provides the voiceprint feature parameter signal 8a based on well-known waveform analysis (step S4). This voiceprint feature parameter signal 8a is applied to the comparison unit 9 along with the voiceprint feature parameter signal 11a from the voiceprint file 11 and is compared with the latter signal, and the numerical data signal 9a with the degree of similarity or the difference digitized is provided from the comparison unit 9 (step S5). This numerical data signal 9a is applied to the decision unit 10 and is subjected to threshold processing. When it is within a preset threshold value, the decision signal 10a provided from the decision unit 10 indicates coincidence, and when it exceeds the threshold value, the decision signal 10a indicates non-coincidence (step S6). In a case where a plurality of voiceprints have been registered in the voiceprint file 11, the comparing and deciding processes described above are performed in succession.

The decision signal 10a thus obtained is applied to the central control unit 5 through the bus B, and a predetermined response based on the decided result is sent through the voice response unit 4 to the telephone set of the calling party, for example, $P_k$ not shown. When the central control unit 5 acknowledges the coincidence between the voiceprint of the calling party and the registered voiceprint in accordance with the decision signal 10a, it supplies the circuit control units $Q_1-Q_n$ with the command C for switching the telephone circuit of the user's house to the telephone circuit of the telephone number of the destination registered in advance. Accordingly, the telephone set $P_i$ of the user's house connected with the telephone set $P_k$ of the calling party through the circuit control $Q_k$ as well as the circuit control unit $Q_i$ has the connection switched to the telephone set $P_j$ of the destination through the circuit control unit $Q_j$ (step S7).

On the other hand, if the central control unit 5 acknowledges non-coincidence between the voiceprint of the calling party and the registered voiceprint, it does not provide the command C of switching the circuits and informs the calling party of the possibility of voice mail through the voice response unit 4 (step S8). Subsequently, if a message is given by the calling party (step S9), it is filed and accumulated in a mail area within the disk service 6 (step S10). And if a message is not given by the calling party (step S9), the circuit of the telephone set $P_i$ is disconnected (step S11).

The functions of this invention thus far described can be readily realized by adding some hardware elements to the personal computer of the voice mail system 2 in the prior art. Therefore, the telephone switching apparatus can be employed as a private or home-made exchange office.

In the embodiment, the voiceprints and the telephone number of the destination have been registered before the user goes out. Needless to say, however, if the programs in the voice response unit 4 and the central control unit 5 are expanded, the voiceprints etc. can be occasionally registered by conversational processing through the telephone set from the destination where the user has gone.

As described above, according to this invention, a voice mail system is furnished with voiceprint discrimination means for discriminating whether or not the voiceprint of a calling party coincides with a predetermined voiceprint, whereupon when the voiceprint of the calling party coincides with the voiceprint registered beforehand, the telephone circuit of the calling party is switched and connected to a predetermined telephone circuit, and if not, a message from the calling party is accumulated as voice mail. Therefore, the invention brings forth the effect of providing a telephone switching apparatus whose user can talk with a truly desired calling party owing to the switching of the telephone circuits without using an unnatural pass word and which functions as an answer phone during the user's absence when the telephone circuits are not switched.

What is claimed is:

1. A telephone switching apparatus which operates in a first mode and a second mode, said apparatus comprising:
   a first telephone circuit connectable with a public telephone network;
   sending means for sending predetermined messages to calling parties calling the first telephone circuit from second telephone circuits through the public telephone network;
   voiceprint discrimination means, operable in the first mode, for discriminating whether a voiceprint of a voice signal of a calling party calling from a second telephone circuit coincides with one of a plurality of predetermined voiceprints;
   switching means, operable in the first mode, for switching and connecting the second telephone circuit to a predetermined third telephone circuit when said voiceprint discrimination means has determined that the voiceprint of the calling party coincides with one of the plurality of predetermined voiceprints; and
   accumulating means operable in the second mode for accumulating voice signals of all calling parties as voice mail and operable in the first mode for accumulating voice signals of those calling parties whose voiceprints do not coincide with one of the plurality of predetermined voiceprints as voice mail.

2. A telephone switching apparatus as defined in claim 1, wherein said voiceprint discrimination means comprises a voiceprint analysis unit which analyses the voiceprint of the voice signal of the calling party, a voiceprint file in which voiceprints of specified persons are accumulated beforehand, a comparison unit which compares voiceprint feature parameter signals provided from said voiceprint analysis unit and said voiceprint file, and a decision unit which determines whether or not the voiceprint of the calling party coincides with a voiceprint of a specified person on the basis of a numerical data signal provided from said comparison unit.

3. A telephone switching apparatus as defined in claim 2 wherein the voiceprint discrimination means includes one of the group consisting of:
   means for calculating $$\cos\theta = X^t \cdot S / |X| \cdot |S|$$

where X is a voiceprint feature vector of the voiceprint of the voice signal of the calling party, S is a reference feature vector of a predetermined voiceprint, and $X^t$ is a transposed vector of X, and for discriminating that the voiceprint of the voice signal of the calling party coincides with the predetermined voiceprint when $\cos\theta$ exceeds a predetermined value; and
   means for calculating $$|X - S| = \Sigma |x_i - s_1|$$

(i=1 to N)

where X is an N-dimensional voiceprint feature vector of the voiceprint of the voice signal of the calling party, S is an N-dimensional reference feature vector of a predetermined voiceprint, and $x_i$ and $s_i$ are components of the N-dimensional vectors X and S, respectively, and for discriminating that the voiceprint of the voice signal of the calling party coincides with the predetermined voiceprint when $|X-S|$ is less than a predetermined value.

* * * * *